Figure 1:
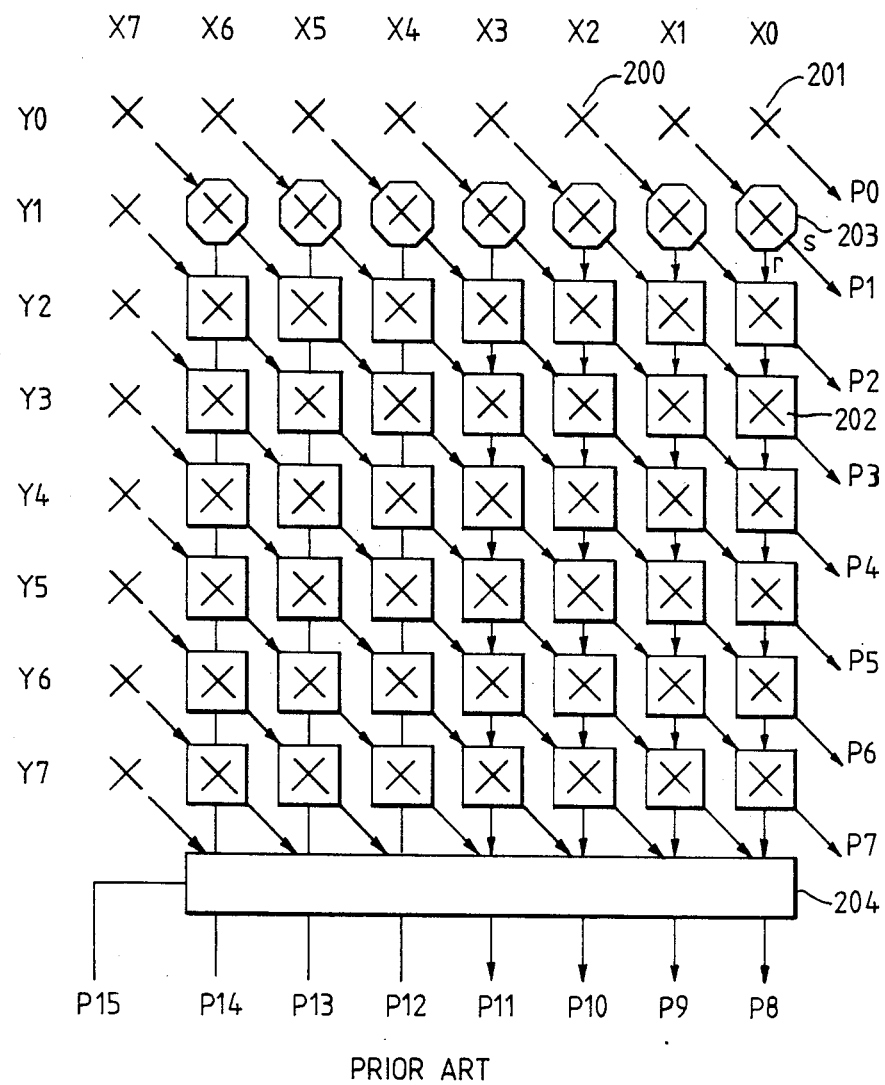

United States Patent [19]

Lerouge

[11] Patent Number: 4,571,701

[45] Date of Patent: Feb. 18, 1986

[54] INTEGRATED CIRCUIT FAST MULTIPLIER STRUCTURE

[75] Inventor: Claude P. H. Lerouge, Maurefas, France

[73] Assignee: International Standard Electric Corp., New York, N.Y.

[21] Appl. No.: 476,689

[22] Filed: Mar. 18, 1983

[30] Foreign Application Priority Data

Mar. 25, 1982 [FR] France ................ 82 05083

[51] Int. Cl.$^4$ ............................................. G06F 7/52
[52] U.S. Cl. ................................................. 364/757
[58] Field of Search ........................ 364/754, 757–760

[56] References Cited

U.S. PATENT DOCUMENTS 3,346,729 10/1967 Dell et al. ..................... 364/758
4,441,158 4/1984 Kanuma ........................ 364/757

FOREIGN PATENT DOCUMENTS 2030743 4/1980 United Kingdom ............... 364/757

Primary Examiner—James D. Thomas
Assistant Examiner—Dale M. Shaw
Attorney, Agent, or Firm—Donald J. Lenkszus

[57] ABSTRACT

There is disclosed a multiplier structure including elementary multipliers and a matrix of binary adder cells of the high-speed carry propagation type associated with the elementary multipliers. The intermediate results to be added are transferred along a matrix diagonal from each adder cell to an adder cell p lines and p columns distant therefrom, where p is a whole number greater than one. The matrix of binary adder cells does not contain cells associated with the first p lines and columns of elementary multipliers and is supplemented by p-1 columns or lines of additional cells on the output side of the matrix furnishing the least significant bits and by p lines or columns of additional cells on the output side of the matrix furnishing the most significant bits. The additional adder cells serve to gather the intermediate results furnished by the adder cells of the p adjacent columns and lines of the associated matrix in order to produce the bits of the final product. The sum signal generation time is approximately p times greater than their carry propagation time to reestablish the balance in the multiplier structure between the sum and carry propagation times so as to maximize the advantage of improved carry propagation speed in the binary adder cells.

5 Claims, 9 Drawing Figures

INTEGRATED CIRCUIT FAST MULTIPLIER STRUCTURE

This invention concerns a high-speed multiplier structure of MOS integrated circuit design for the multiplication of two binary words of N bits, the said structure comprising $N^2$ elementary multipliers arranged in a square matrix, each furnishing the partial product of a bit of the first of the said words, assigned to the corresponding column of the matrix, and a bit of the second word, assigned to the corresponding line of the matrix, and elementary binary adder cells associated with the elementary multipliers to produce the successive sums required to obtain the 2N bits of the final product, these cells also being arranged in an associated matrix in which the sum output of each cell is connected to an input of the adjacent cell in the direction of the matrix diagonal passing through the elementary multipliers furnishing partial products of the same order and in which the carry output of each cell is connected to an input of the adjacent cell in the direction, line or column of the said associated matrix, going toward the output side of the latter matrix furnishing the highest order bits of the final product.

Such a known structure using the "carry-save adder" technique is described for example in the article by Shlomo Waser "High-speed monolithic multipliers for real-time digital signal processing" published in COMPUTER, October 1978, pages 19 to 29, and in particular on page 21. It is shown in FIG. 1 of this patent application and is characterized mainly by the deferment of the addition of carries to a subsequent stage, which eliminates waiting for the carry over to execute the following addition. In such a structure, the multiplication speed depends upon the carry propagation time. Binary adder cells are currently known providing for high-speed carry propagation which improves the performance of an asynchronous multiplier of the above described type. Such cells are described for example in the French patent application No. 81 21656, filed by the applicant on Nov. 19, 1981. In these cells, carry propagation time is favoured with respect to sum generation time.

However, this introduces an unbalance between carry and sum propagation times and, if this unbalance is exaggerated in favour of the carry, the problem arises that at the following adjacent cell, the carry is available very quickly and we must await the sum signal from the preceding cell. Thus, the advantage of a high-speed carry propagation is lost.

The object of this invention is to overcome this problem by reestablishing the balance in the multiplier structure between the sum and carry propagation times so as to maximize the advantage of improved carry propagation speed in the binary adder cells.

According to the invention, this is obtained, in a multiplier structure of the type described at the beginning, by the fact that, the binary adder cells being of the high-speed carry propagation type, the transfers of intermediate results to be added in the direction of the said diagonal are made from p to p cells, where p is a whole number greater than one, and by the fact that the said associated matrix of binary adder cells does no contain cells associated with the first p lines and columns of elementary multipliers and is supplemented by p-1 columns or lines of additional cells on the output side of the matrix furnishing the least significant bits and by p lines or columns of additional cells on the output side of the matrix furnishing the most significant bits, the said additional cells serving to gather the intermediate results furnished by the cells of the p adjacent columns and lines of the associated matrix in order to produce the bits of the final product.

According to another characteristic of the invention, the binary adder cells are of a high-speed carry type such that their sum signal generation time is approximately p times greater than their carry propagation time.

The invention will be better understood and other characteristics will be brought out in the following description and attached drawings in which:

FIG. 1 shows a diagram of a known 8×8 multiplier structure;

FIGS. 2 to 5 respesent diagrams of a 16×16 multiplier structure accordng to the invention with the various interconnections; and FIGS. 6 to 9 represent possible block diagrams of the various types of binary adder cells used in the multiplier structures of FIGS. 2 to 5.

FIG. 1 shows a known 8×8 multiplier structure in accordance with the "carry-save" structure described in the above mentioned article by Shlomo Waser. This multiplier permits the multiplication of two binary words containing eight bits X0 to X7 and Y0 to Y7. Each of the symbols X arranged in a square matrix represents an elementary multiplier, such as 200 or 201, for example an AND gate, furnishing the partial product of the bit of the first word corresponding to the column in which the multiplier is located (X2 for the multiplier 200) and of the bit of the second word corresponding to the line in which the multiplier is located (Y0 for the multiplier 200). The 8×8 multiplier structure also includes binary adder cells, such as 202 or 203, arranged in an associated matrix and producing the partial sums required to obtain the bits P0 to P15 of the final product. The cells symbolized by an octagon, such as 203, are cells with two inputs and two outputs, namely carry r toward the bottom and sum s obliquely to the side. Cells symbolized by a square, such as 202, are cells with three inputs, one of which receives the carry from the preceding cell and with two outputs, sum and carry, arranged as in the preceding cells. Cells enclosing a symbol X are cells in which one input receives the partial product furnished by the local elementary multiplier. All of the cells in FIG. 1 fall into this category, but the same is not true in the following figures as it will be seen below.

It will be observed that all sums furnished by the cells are sent to an input of the adjacent cell of the same order, in the direction of the matrix diagonal passing through the elementary multipliers furnishing partial products of the same order. Carries are propagated vertically toward the output side of the matrix furnishing the most significant bits of the final product (P8 to P15). At the output at the bottom of the matrix, we have two operands, one consisting of the carries from the last stage of cells and the other being the sums of that same stage. The last additions are carred out, in the well known way, by means of an adder of the "carry look-ahead" type, such as 204.

As it can be seen, the multiplication speed is governed mainly in such a structure by the carry propagation time. Furthermore, a carry look-ahead adder becomes very complex and costly when word lenths of a few bits are exceeded.

This invention proposes to make use of high-speed carry cells such as those described in the above mentioned French patent application No. 81 21656 and to take maximum advantage of them with no reduction in multiplier performance due to the relative lengthening of sum generation time. It is further proposed to avoid the use of carry look-ahead adders.

FIGS. 2 to 5 represent a 16×16 multiplier structure based on these principles. The four FIGS. 2 to 5 represent the same structure with the various interconnections indicated on different figures for purposes of clarity. In these figures, the elementary multipliers symbolized by an X, such as 200 or 201, are NAND gates receiving the bit X of the corresponding column and the bit Y of the corresponding line. The bits X0 to X15 of the first word are applied respectively to the columns numbered 0 to 15 and the bits Y0 to Y15 of the second word are applied respectively to the lines numbered 0 to 15.

Furthermore, the multiplier structure contains an associated matrix of adder cells of four different types C1, C2, C'2 and C3, symbolized respectively by squares, circles, circles with a small circle underneath to indicte schematically the inversion of the carry, and hexagons. All of these cells have a sum output shown obliquely toward the bottom in the direction of the diagonal mentioned above, and a carry output shown vertically toward the bottom, except the last line numbered 18 as we shall see below.

Figure 3:
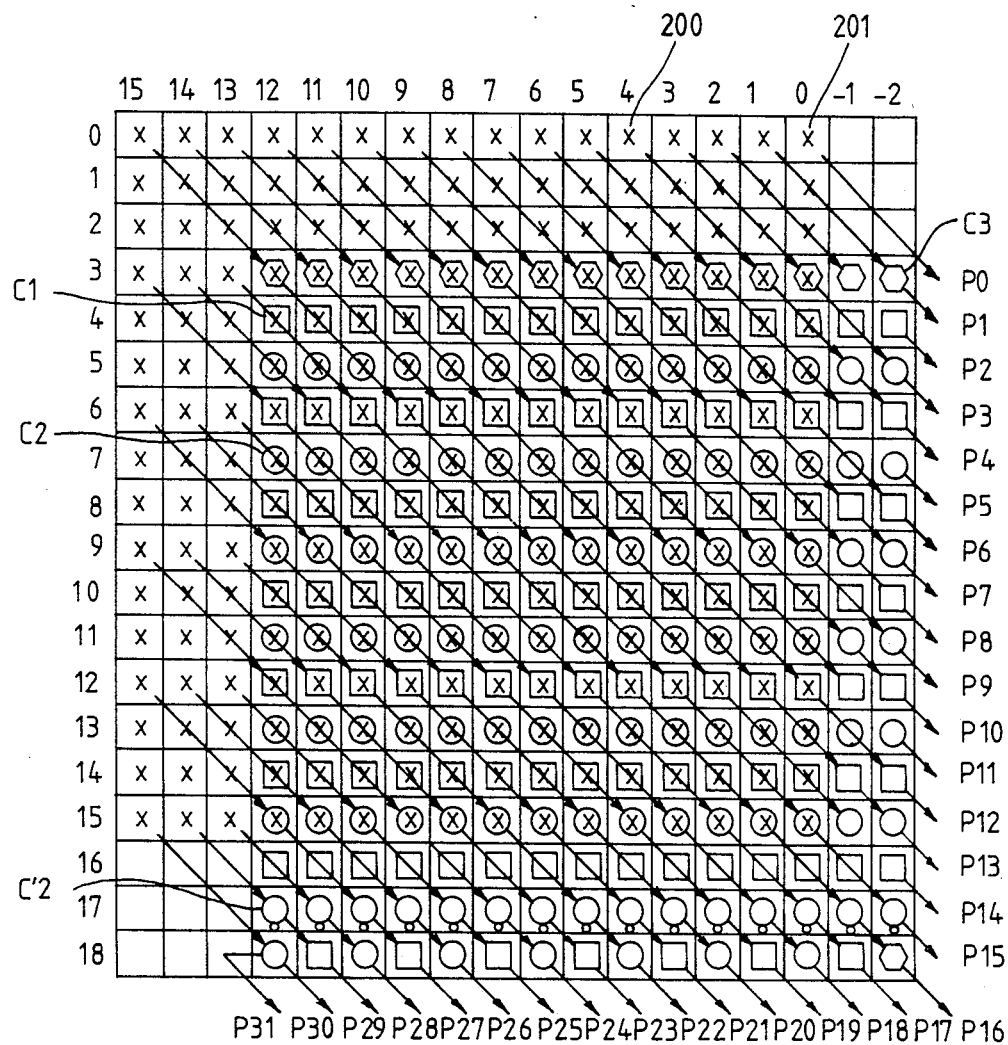
Figure 4:
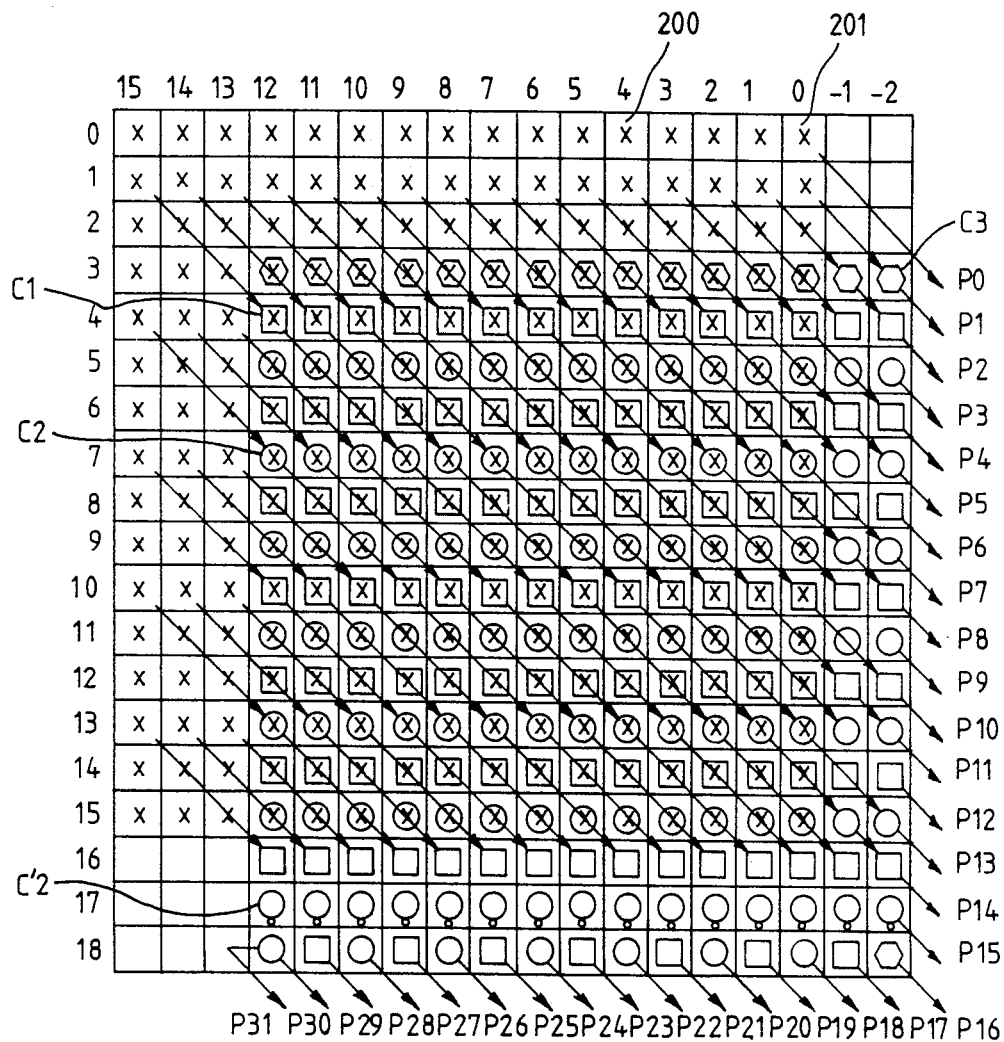
Figure 5:
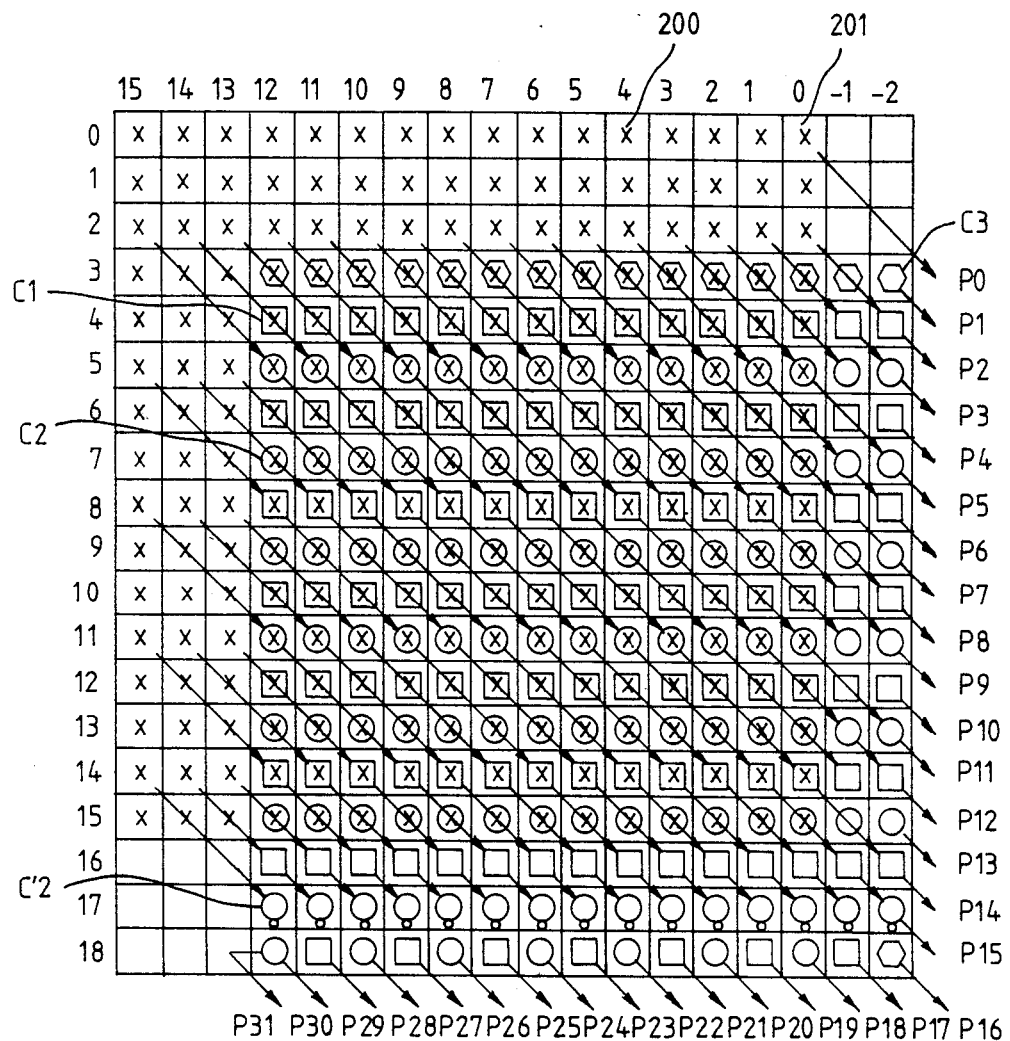

In the direction of the diagonal (sum propagation direction), the intermediate results are transferred from one cell to the next third cell (FIGS. 3 to 5). Thus the first three lines (0, 1, 2) and the first three columns (15, 14, 13) of the elementary multiplier matrix do not have associated cells in the associated matrix of binary adder cells. This associated matrix is comleted by a "trough" collecting the intermediate results coming from the cells of columns 0 to 2 and of lines 13 to 15 to form the bits of the final product P0 to P31. This "trough" consists of two columns −1, −2 and of three lines 16 to 18 of additional cells. These additional cells are not associated with the local elementary multipliers.

Before explaining the structure of the multiplier and its operation in greater detail, the design of the various types of cells should be explained. All of the cells furnish the sum in complemented form $\overline{S}$. On the other hand, the carry is sometimes the true value Rs, and sometimes the complemented value $\overline{Rs}$, depending upon the type of cell.

Figure 6:
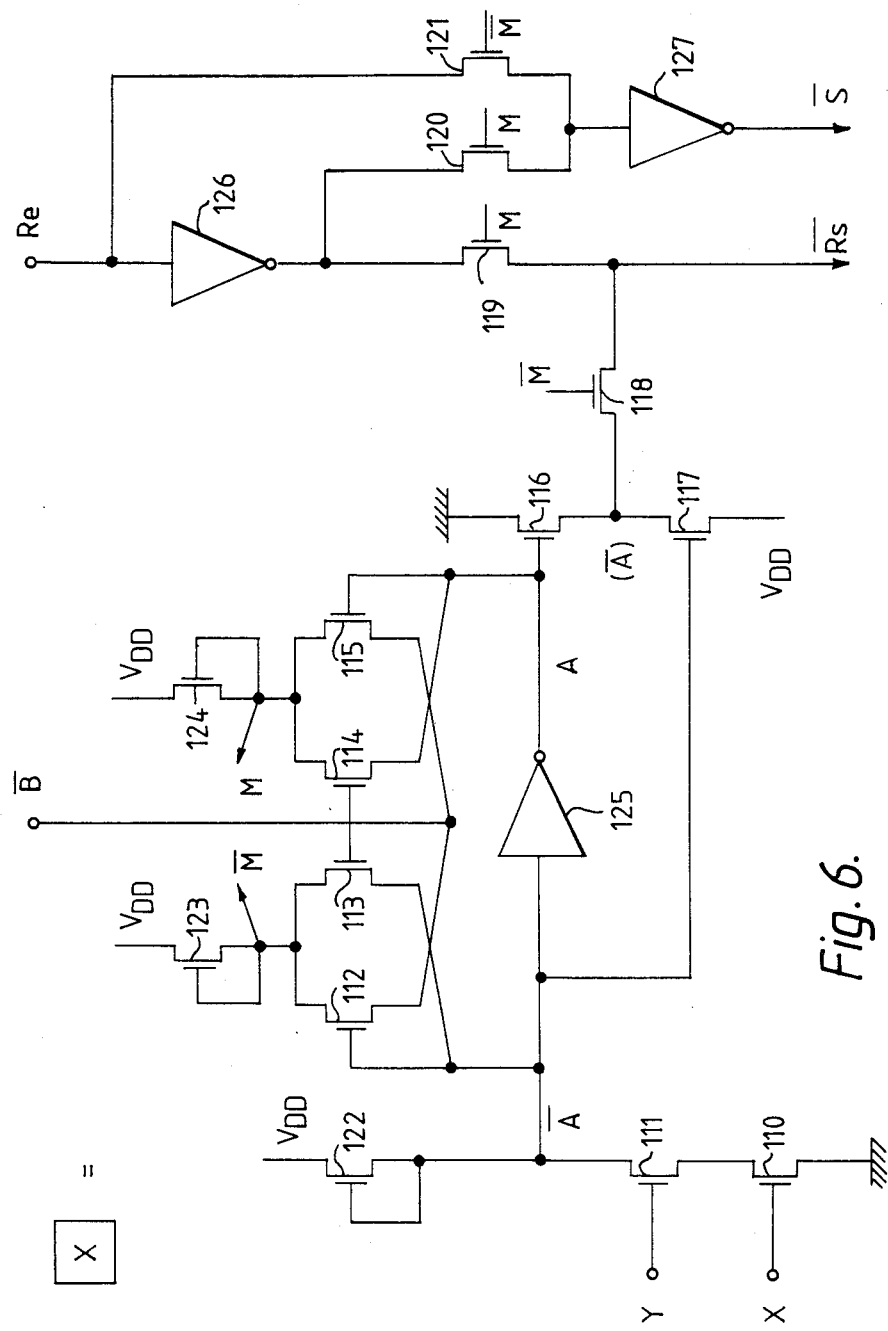

Cells of the type C1, symbolized by a square, are shown in FIG. 6. These are three-input cells receiving the complemented values $\overline{A}$, $\overline{B}$ and the true value of the carry Re from the preceding cell. The complemented value $\overline{A}$ is obtained, for the cell shown, from a local elementary multiplier consisting of a NAND gate producing the partial product of the bits X and Y. This NAND gate includes the MOS transistors 110 and 111 in series with an MOS transistor 122 wired as a resistor. This cell has already been described in the French patent application No. 81 21656 (FIG. 12). It contains an intermediate cell to calculate the variables M and $\overline{M}$, where M is the result of an exclusive OR operation of variables A and B. This intermediate calculation cell consists of the MOS transistors 112 to 115, the MOS transistors 123 and 124 wired as resistors and an inverter 125. A decoupling cell (116, 117) is used to send the value $\overline{A}$ to the carry output $\overline{Rs}$ when the variable M is at level 0, through the MOS transistor 118, whereas the output $\overline{Rs}$ receives the carry from input Re inverted by the inverter 126 when the variable M is at level 1, through the MOS transistor 119. The complemented sum $\overline{S}$ is obtained from the values of Re and $\overline{Re}$ by means of the MOS transistors 120 and 121 and the inverter 127. The C1 cells therefore furnish the sum and carry in complemented form.

Figure 7:
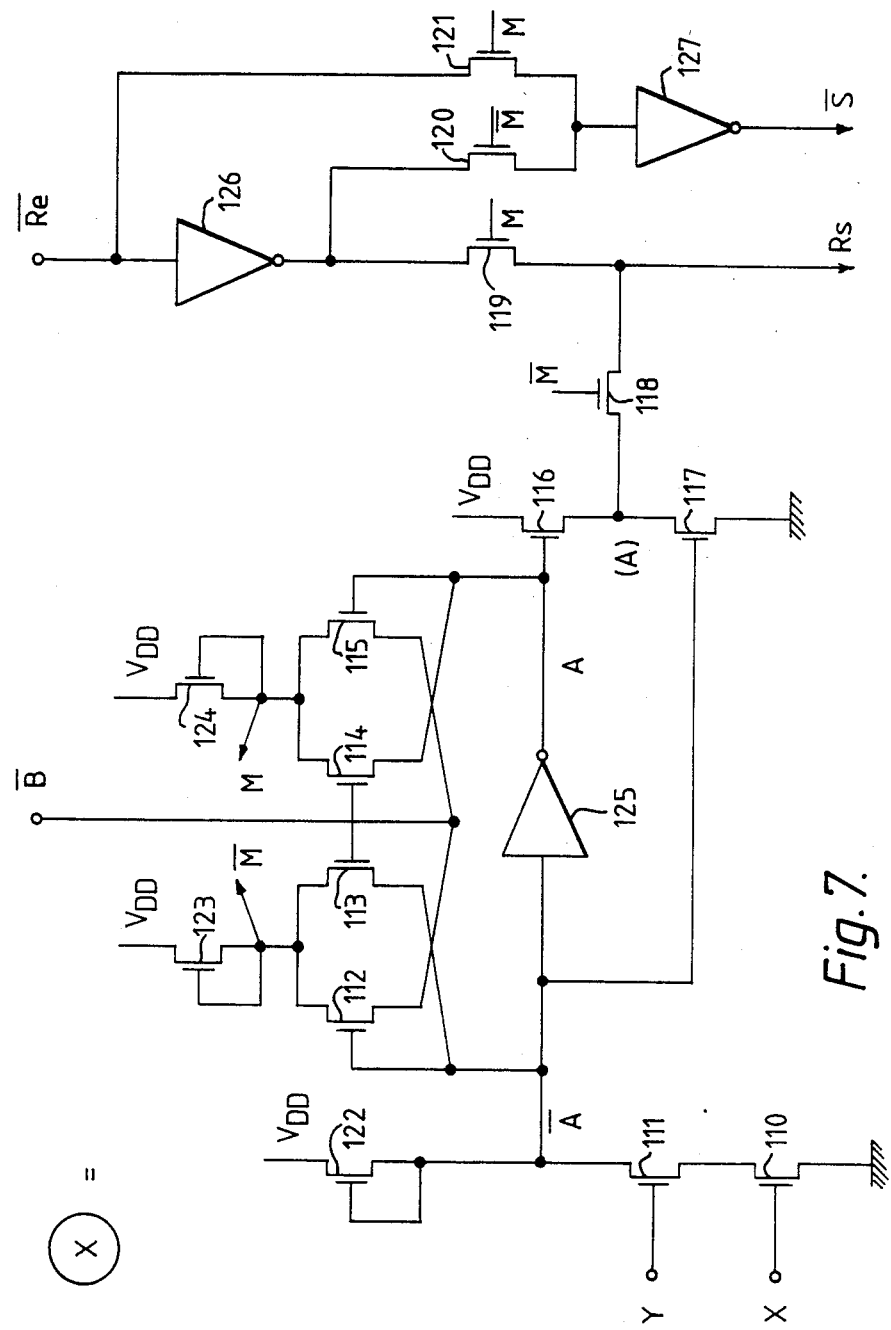

FIG. 7 represents a cell of the type C2, symbolized by a circle. This cell has three inputs receiving the complemented variables $\overline{A}$, $\overline{B}$ and a complemented carry $\overline{Re}$ from the preceding cell. It furnishes a complemented sum output $\overline{S}$ and a true carry output Rs. The same references have been used as those in FIG. 6. The only differences lie in the fact that the connections to ground and to the voltage source $V_{DD}$ of the decoupling cell 116, 117 are reversed so as to furnish the true value A to transistor 118 and in the fact that transistors 120 and 121 are controlled by $\overline{M}$ and M respectively instead of M and $\overline{M}$.

Figure 8:
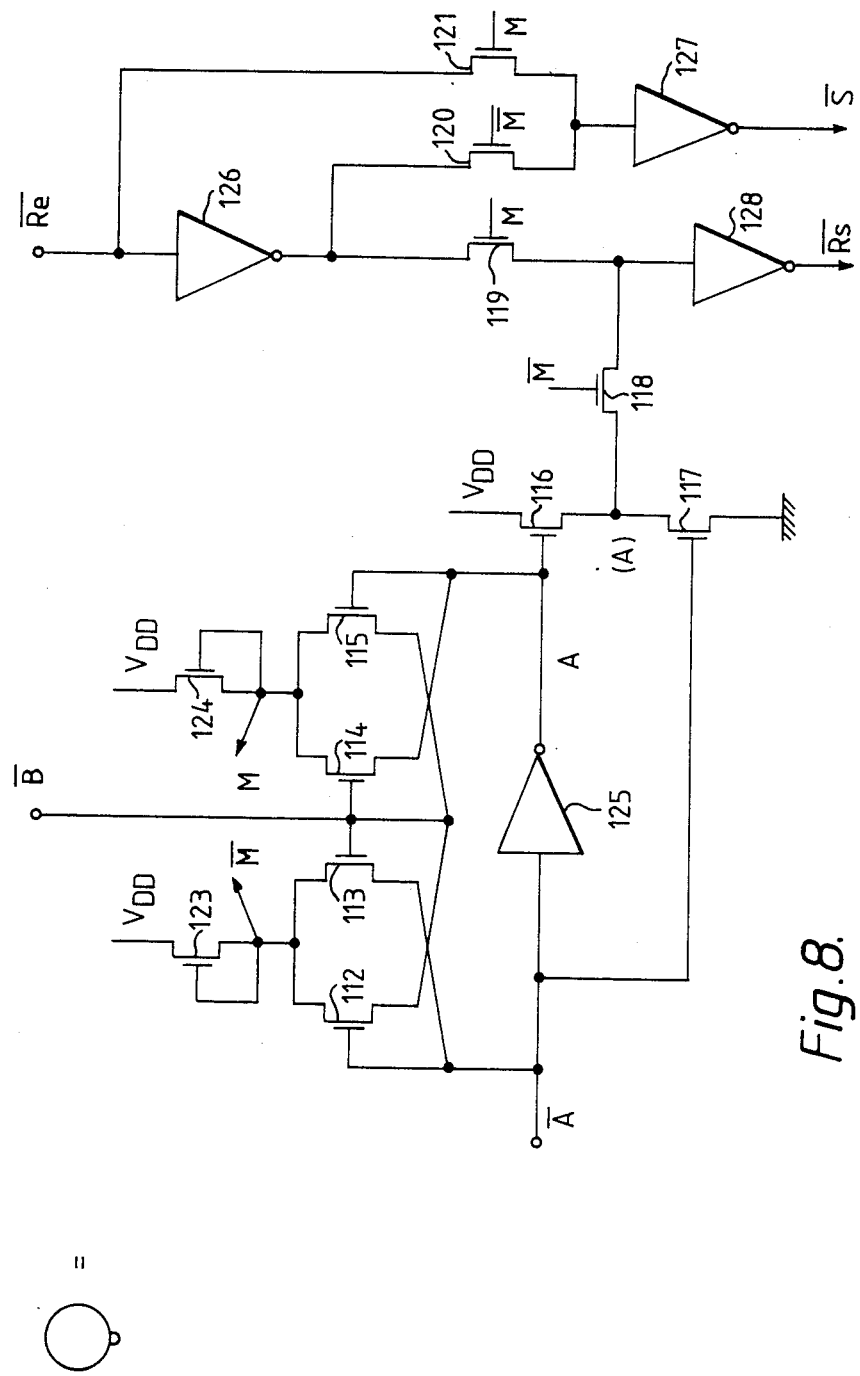

FIG. 8 represents a cell of the type C'2, symbolized by a circle with a small circle underneath. This is a cell of the type C2, modified by the addition of an inverter 128 at the carry output. Since this cell is not associated with a local elementary multiplier, the NAND gate 110, 111, 122 of FIG. 7 has been eliminated. This cell C'2 has three inputs $\overline{A}$, $\overline{B}$ and $\overline{Re}$ and two outputs $\overline{Rs}$ and $\overline{S}$.

Figure 9:
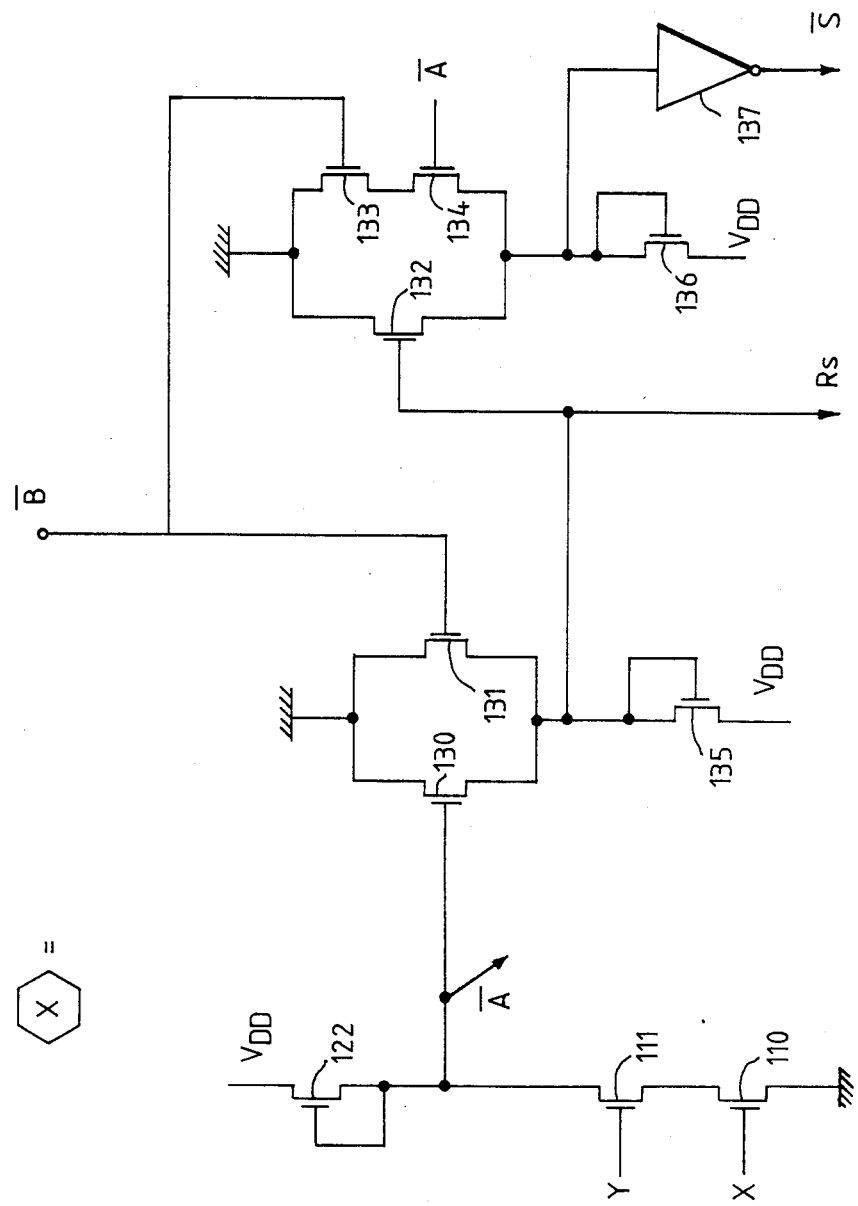

Lastly, FIG. 9 represents a cell of the type C3, symbolized by an hexagon. This is a cell having two inputs, receiving the complemented variables $\overline{A}$ and $\overline{B}$, and two outputs furnishing the complemented sum $\overline{S}$ and the true carry Rs. This cell contains two MOS transistors 130, 131 in parallel between ground and an MOS transistor wired as a resistor 135 connected to the voltage source $V_{DD}$. Transistors 130 and 131 are controlled respectively by the variables $\overline{A}$ and $\overline{B}$, and the carry output Rs is taken between the transistors 130, 131 and the transistor 135 wired as a resistor. The complemented sum $\overline{S}$ is obtained by means of transistors 133 and 134 in series and the transistor 132 mounted in parallel between ground and a transistor 136, wired as a resistor and connected to the voltage source $V_{DD}$, the sum $\overline{S}$ being obtained through an inverter 137 connected to the junction between the transistors 132 to 134 on the one hand and the transistor 136 on the other hand. Transistor 132 is controlled by the output carry Rs, and transistors 133 and 134 by the variables $\overline{A}$ and $\overline{B}$ respectively.

Figure 2:
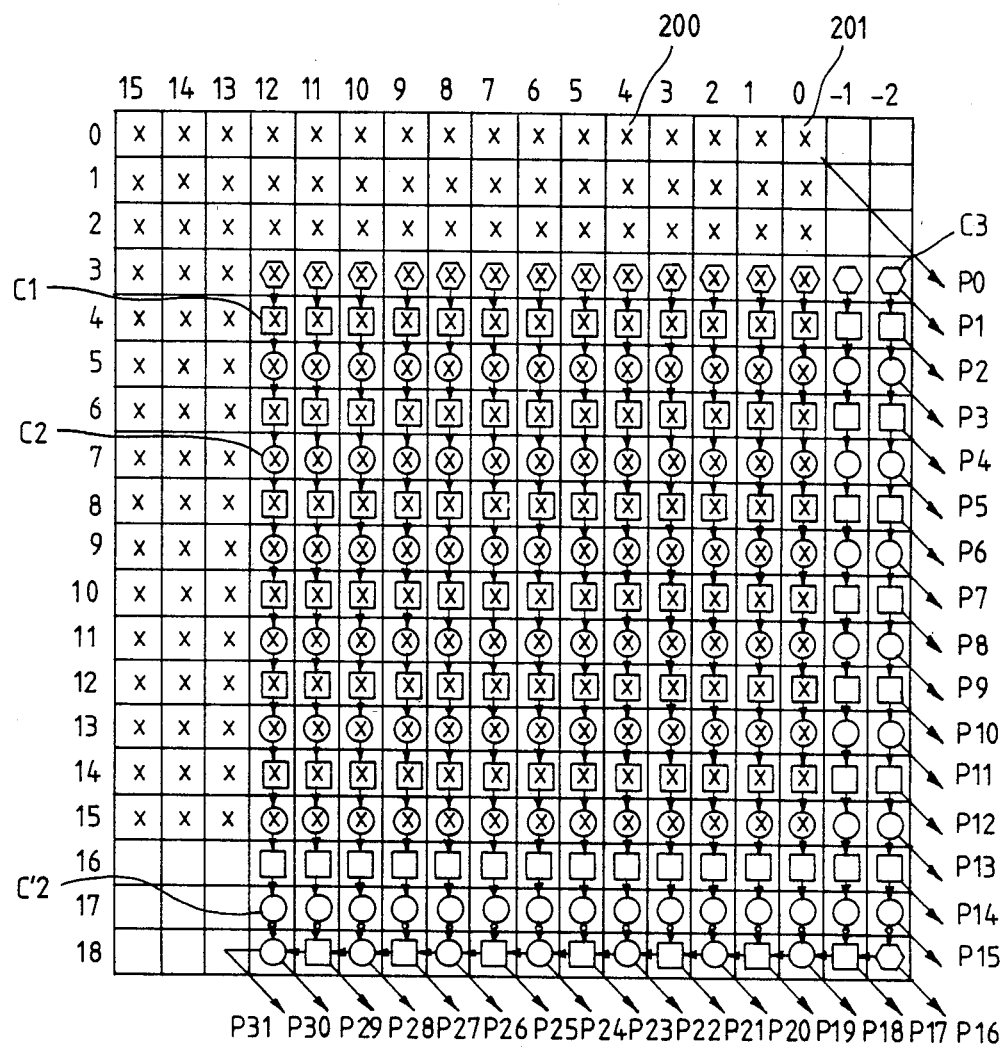

Returning now to the multiplier structure of FIGS. 2 to 5, we see that the sum outputs of all of the cells, being complemented outputs $\overline{S}$, can be transferred to any other cell which always has at least two complemented variable inputs. Only the carry outputs and inputs alternate between true and complemented values. This being the case, FIG. 2 shows the propagation of carries between cells. One line of cells in two is composed of cells having a true carry input and a complemented carry output and one line of cells in two of cells having a complemented carry input and a true carry output, except for the next to last line 17 being a part of the "trough" which is composed of C'2 cells furnishing a complemented carry output and the last line 18 in which the carries are propagated along the line, toward the most significant bits, and which is composed alternately of C1 and C2 cells. The cell located at the vertex of the matrix in the direction of the diagonal is a C3 cell with two inputs, and its sum output furnishes the bit P16 of the final product. Lastly, the first line 3 of the associated matrix is a line of C3 cells with two complemented inputs. This presence of two complemented inputs on each cell permits the sole use of NAND gates for the elementary multipliers, thus eliminating the inverters which would otherwise have to be associated with them. In addition, the use of alternation for the carries permits the number of inverters through which the carries travel to be reduced to a minimum, thus accelerating their propagation.

FIGS. 3, 4 and 5 show the interconnections in the direction of propagation of the sums in parallel with the already mentioned diagonal, respectively for the lines 0, 3, 6 . . . , the lines 1, 4, 7 . . . and the lines 2, 5, 8 . . . .

The invention has been described for the case of a 16×16 multiplier with transfers between every third cell. In this case, the binary adder cells C1, C2, C'2, C3 should preferably have a carry propagation time approximately three times shorter than the sum generation time. However, jumps of two by two or more generally of p by p can be envisaged for multipliers of words of N bits, the number being selected as a function of the number N in order to optimize the operation of the multiplier and of the binary adder cells. As it can be verified easily, in the case of jumps of p by p, the "trough" would contain p-1 columns on the side of the cell matrix where the least significant bits are delivered and p lines of cells on the side of the matrix where the most significant bits are delivered, the last line being a line of alternate cells and the next to the last line furnishing complemented carries as in the above described example.

Moreover, the principles of the invention, especially the jump of p by p, have been described with reference to a multiplier structure of the "carry-save" type. But it is clear that they are also applicable to the case of a multiplier using another structure, for example based on the Booth algorithm or on a Wallace tree-like structure.

The invention is therefore in no way limited to the described embodiment and other variants still lying within its scope can be imagined.

I claim:

1. A high-speed multiplier structure of MOS integrated circuit design for the multiplication of two binary words of N bits, the said structure comprising $N^2$ elementary multipliers arranged in a square matrix, each furnishing the partial product of a bit of the first of the said words, assigned to the corresponding column of the matrix, and a bit of the second word, assigned to the corresponding line of the matrix, and elementary binary adder cells associated with the elementary multipliers to produce the successive sums required to obtain the 2N bits of the final product, these cells also being arranged in an associated matrix in which the sum output of each cell is connected to an input of the adjacent cell in the direction of the matrix diagonal passing through the elementary multipliers furnishing partial products of the same order and in which the carry output of each cell is connected to an input of the adjacent cell in the direction, line or column of the said associated matrix, going toward the output side of the latter matrix furnishing the most significant bits of the final product, the improvement comprising said binary adder cells each including a sum output and being of the high-speed carry propagation type, said cells being arranged to transfer the intermediate results at their sum outputs along said matrix diagonal to the respective cell p lines and p columns distant therefrom, where p is a whole number greater than one, wherein the said associated matrix of binary adder cells does not contain cells associated with the first p lines and columns of said elementary multipliers, and wherein said associated matrix of binary adders include p-1 columns or lines of additional cells on the output side of the matrix arranged to furnish the least significant bits and p lines or columns of additional cells on the output side of the matrix arranged to furnish the most significant bits, the said additional cells serving to gather the intermediate results furnished by the cells p columns and p lines distant therefrom on the input side thereof of the associated matrix in order to produce the bits of the final product.

2. A multiplier structure according to claim 1, wherein said binary adder cells are of a high-speed carry propagation type such that their sum signal generation time is approximately p times greater than the propagation time of the carry.

3. A multiplier structure according to claim 1, wherein said binary adder cells are of the type having an addend input (A), an augend input ($\overline{B}$), and a carry input (Re or $\overline{Re}$) and a sum output ($\overline{S}$) and a carry output (Rs or $\overline{Rs}$), wherein the binary adder cells of the first line or column on the side of the matrix from which the carries are propagated perpendicularly have only an addend input ($\overline{A}$) and an augend input ($\overline{B}$) and wherein, in the last line or column of additional cells on the side of the matrix which furnishes the most significant bits of the final product, the carry output of each cell is adapted to be sent to an input of the adjacent cell of the same line in the direction of the most significant bits, the cell of said last line which is located at the vertex of the matrix on the said diagonal being a cell having two inputs and two outputs whose sum output furnishes the $N+1^{th}$ bit of the final product.

4. A multiplier structure according to claim 3, wherein each elementary multiplier comprises a NAND gate arranged to furnish the addend complement (A) of the corresponding partial product (XY), wherein each binary adder cell is arranged to furnish the complement of the sum (S) at its sum output, wherein the lines of binary adder cells of the matrix extending perpendicularly to the carry propagation direction consists alternately of a line of cells arranged to provide the true value (Rs) of the carry at their carry output in response to input variables all in complemented form and a line of cells arranged to provide the complemented value ($\overline{Rs}$) of the carry at their carry output in response to two complemented input variables and the true carry from the preceding cell, wherein the cells of the first line are cells having only an addend input and an augend input for receiving two complemented addend and augend values ($\overline{A}$, $\overline{B}$) at their inputs, wherein the cells of the next to the last line are cells arranged to provide the complemented value of the carry at their output and wherein cells of the last line are alternately cells arranged to provide the true value and cells arranged to provide the complemented value of the carry.

5. A multiplier structure according to claim 4, wherein said two-input binary adder cells contain two MOS transistors connected in parallel between ground and an MOS transistor arranged as a resistor and connected to a voltage source ($V_{DD}$), the carry output (Rs) of said two-input binary adder cells being at the junction point between the parallel transistors, said parallel connected transistors being respectively controlled by said complemented addend and augend input variables ($\overline{A}$, $\overline{B}$) and said transistor wired as a resistor, and wherein said two-input binary adder cells also contain, a second MOS transistor arranged as a resistor, an MOS transistor controlled by the carry output (Rs) and coupled in parallel with two series coupled MOS transistors controlled respectively by the complemented addend and augend input variables ($\overline{A}$, $\overline{B}$), the second transistor arranged as a resistor being connected also to the voltage source ($V_{DD}$), and an inverter arranged to provide the complemented sum output ($\overline{S}$) and coupled at the terminal of the second resistor-arranged transistor which is opposite the voltage source.

* * * * *